United States Patent [19]
Kerkkonen et al.

[11] 3,951,938
[45] Apr. 20, 1976

[54] METHOD OF SEPARATING GLUTEN FROM WHEAT FLOUR

[75] Inventors: H. K. Kerkkonen; K. M. J. Laine; M. A. Alanen; H. V. Renner, all of Raisio, Finland

[73] Assignee: Oy Vehna Ab, Raisio, Finland

[22] Filed: Mar. 14, 1975

[21] Appl. No.: 558,387

Related U.S. Application Data
[63] Continuation-in-part of Ser. No. 391,924, Aug. 27, 1973, abandoned.

[30] Foreign Application Priority Data
Sept. 8, 1972 Finland.............................. 2477/72
June 7, 1973 Sweden.............................. 7308091

[52] U.S. Cl............................... 260/112 G; 127/67
[51] Int. Cl.²......................... C07G 7/00; C13L 1/00
[58] Field of Search..................... 260/112 G; 127/67

[56] References Cited
UNITED STATES PATENTS

| | | | |
|---|---|---|---|
| 260,736 | 7/1882 | Becker.................................. | 127/70 |
| 2,368,668 | 2/1945 | Langford et al. ................. | 127/68 X |
| 2,504,962 | 4/1950 | Burdick ....................... | 260/112 G X |
| 2,530,823 | 11/1950 | Kilander et al. ................ | 260/112 G |
| 2,572,225 | 10/1951 | Walsh et al. ................. | 260/112 G X |
| 2,631,111 | 3/1953 | Meyer.......................... | 260/112 G X |
| 3,501,451 | 3/1970 | Fellers et al. ..................... | 260/112 G |
| 3,542,754 | 11/1970 | Fellers et al. ..................... | 260/112 G |

OTHER PUBLICATIONS

"Pilot Plant Studies on the Continuous Batter Process to Recover Gluten from Wheat Flour" R. A. Anderson et al. Cereal Chem. 37/180, 1960.
"Process for Protein–Starch Separation in Wheat Flour" Johnston et al. J. Food Science Vol. 36 p. 649 (1971).
"Process for Protein–Starch Separation in Wheat Flour" Fellers et al. Food Tech. II Vol. 23 p. 162.

*Primary Examiner*—Joseph L. Schofer
*Assistant Examiner*—Herbert J. Lilling
*Attorney, Agent, or Firm*—Nolte and Nolte

[57] ABSTRACT

A process for separating gluten with a protein content of at least 80% on a dry base and in a vital and non-denatured condition from wheat flour which comprises:

1. Mixing wheat flour with water in a weight ratio of 1.2–2.0 parts water per part wheat at a temperature of 30°–50°C to form a suspension of flour in water;
2. Homogenizing said suspension to achieve a free-flowing dispersion of wheat flour in water by passing said suspension through a mill of the pin-mill type;
3. Separating from said dispersion a main heavy portion (A) comprising a starch and a light portion (B) comprising a protein concentrate;
4. Allowing said light portion (B) to stand, free of agitation without dilution, at 30°–50°C for 10–90 minutes to form gluten thread-like formations without separation;
5. Thereafter, adding to said light portion (B) at least one part fresh or recycled water per part of said portion (B) and subjecting the so-diluted liquid to a beating action whereby to agglomerate said gluten formations with one another and squeeze the water containing non-gluten solids substantially out of the resultant agglomerates; and
6. Separating said gluten agglomerates from the remaining liquid.

5 Claims, 1 Drawing Figure

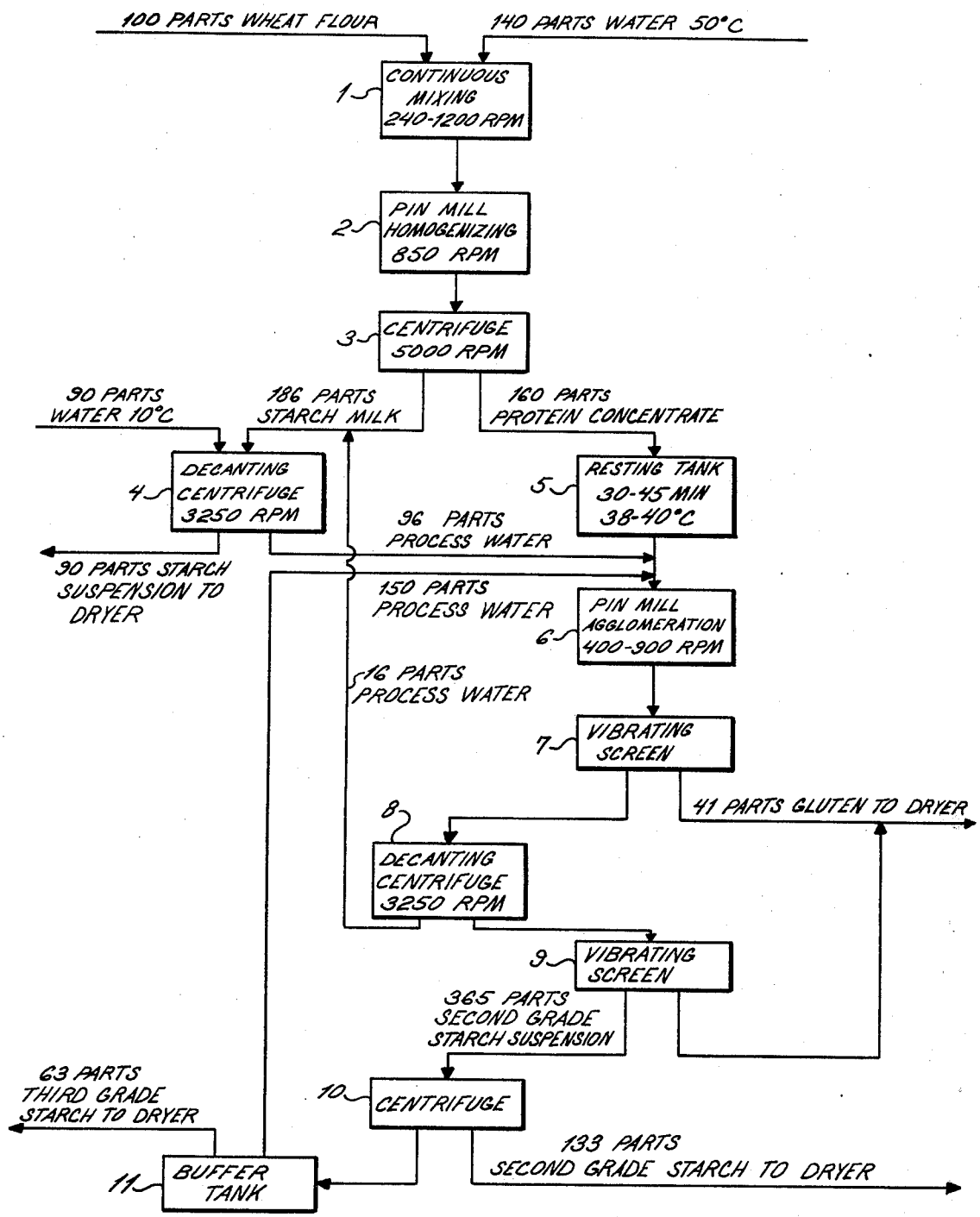

METHOD OF SEPARATING GLUTEN FROM WHEAT FLOUR

CROSS REFERENCE TO RELATED APPLICATION

This is a continuation-in-part of co-pending application Ser. No. 391,924, filed Aug. 27, 1973, entitled "METHOD OF SEPARATING GLUTEN FROM WHEAT FLOUR", and now abandoned.

BACKGROUND OF THE INVENTION

1. Field of the Invention

This invention relates to the process for separation of a proteinaceous gluten from wheat flour and is particularly directed to the separation of a proteinaceous gluten having a high protein concentration above 80% from wheat flour whereby the gluten is recovered in a non-denatured and vital form. This invention is particularly directed to a process for the separation of highly proteinaceous gluten from wheat flour by a continuous process which does not require substantial amounts of water. This invention is also directed to such a process which can be carried out in a minimum period of time and without substantial mechanical working of the masses involved in the processing.

2. Discussion of the Prior Art

The separation of wheat flour into its component parts, starch and gluten, is well known. Kerr in *Chemistry and Industry of Starch*, second edition (1950) and Knight in *The Chemistry of Wheat, Starch and Gluten and Their Conversion Products* (1965) both review the processes which had been involved. Essentially, the early commercial embodiment for the separation of wheat flour in its components was the Martin method, which commenced in about the year 1835. The Martin method is still almost exclusively used industrially in its various applications. Essentially, it involves initially forming a dough by mixing wheat flour with a small quantity of water. After a suitable resting time, the dough is kneaded with simultaneous continuous addition of water. The starch is thus gradually washed off from the elastic gluten whereby both the starch and the gluten eventually are separated from each other in very pure fractions. The method however requires the use of large quantities of water, generally 10–17 fold water per quantity of flour. Additionally, usually about 8–10, and even up to 20%, of the dry content of the flour is lost in the diluted waste water. Obviously, this presents a considerable problem commercially. Even in its best forms, the water content of the Martin process has been reduced to 6 fold the flour quantity.

Other methods have been proposed. One such method is known as the modified Fesca process and is described by Fellers et al. in "Process for Protein-Starch Separation in Wheat Flour", (1969), *Food Technology*, volume 23, 162–166, and Johnston et al. in "Process for Protein-Starch Separation in Wheat Flour", 1971, *Journal of Food Science*, volume 36, 649–652. Another process is known as the "batter process" and it is described by R. A. Anderson et al. in "Continuous Batter Process for Separating Gluten from Wheat Flour", (1958), and later in 1960 in an article entitled "Pilot Plant Studies on the Continuous Batter Process to Recover Gluten from Wheat Flour". The first article is found in *Cereal Chemistry*, volume 35, 449–457, and the latter is found in that same journal, volume 37, 180–188. These processes have in common the initial step directed to preparing a free-flowing smooth slurry or batter having a small water/flour ratio. In the Fesca process, the desired slurry temperature is about 30°C while in the batter process, higher temperatures, e.g. 40°–55°C, are employed. These temperature differences constitute one of the basic differences between the two processes.

In the Fesca process, it is desired to prevent the gluten from hydrating, or coalescing, so that pure prime starch can be centrifuged directly from the slurry leaving a liquid protein concentrate fraction. This is in direct contrast to the batter process, where after initial slurry preparation, the addition of a second increment of water and the higher temperature results in an almost instant gluten hydration. Once the gluten is coalesced, it is shredded in a cutting pump, the occluded starch washed out, and the gluten recovered on the screen where it is further washed. The filtrate, or remaining slurry, is further fractionated to yield prime starch, low grade starch, waste fiber-gluten solids and waste solubles in the liquid effluent. In the Fesca process, all of the flour constituents are recovered in the two resulting products: prime starch and a protein concentrate of 20–40% protein content. No provisions thus far have been made to separate the gluten from the liquid protein concentrate in a purified state.

In an older process described by Burdick in U.S. Pat. No. 2,504,962 (Apr. 25, 1950), the same principle of the batter process is utilized until screening of the gluten. The screenings, or crude gluten, is then agitated and aerated with three parts of additional water to beat thoroughly the starch and bran from the gluten and produce a gluten foam which is then separated by flotation.

In still another process described by Walsh et al. in U.S. Pat. No. 2,572,225 (Oct. 23, 1951), the principle of the Martin process is employed but the elastic dough is repeatedly drawn out or stretched into long strings or ropes so as to expose a maximum surface to the washing action of the added water. The gluten is recovered in a de-natured or non-vital condition.

It has become an object of this invention, therefore, to provide an improvement over the Martin process, wherein small quantities of water relative to the amount of flour can be employed to separate the wheat flour into the starch and gluten. It has also become desirable to provide a process wherein the formation of an elastic dough or the like is not involved, whereby the mechanical working of the mass is held at a minimum. Still another object of this invention is to provide a process for the separation of wheat flour into its components, whereby a highly proteinaceous gluten is obtained, which is neither de-natured nor in a non-vital condition. It has become still a further object of this invention to provide a process whereby use of operation, and flotation processes are not required. Moreover, it has become desirable to provide a process for the preparation of a gluten having a protein content of at least 80%.

SUMMARY OF THE INVENTION

In accordance with and fulfilling the objects of the present invention, there is provided a process for the separation of wheat flour into its components, whereby gluten having a protein content of at least 80% on a dry basis in a vital and non-denatured condition, is provided, which process comprises:

1. Mixing wheat flour with water in a weight ratio of 1.2–2.0 parts water per part wheat at a temperature of 30°–50°C to form a suspension of flour in water;
2. Homogenizing said suspension to achieve a free-flowing dispersion of wheat flour and water by passing said suspension through a mill of the pin-mill type;
3. Separating from said dispersion a main heavy portion (A) comprising starch and a light portion (B) comprising a protein concentrate;
4. Allowing said light portion (B) to stand, free of agitiation and without dilution, at 30°–50°C for 10–90 minutes to form gluten thread-like formations without separation;
5. Thereafter, adding to said light portion (B) at least one part fresh or recycled water per part of said portion and subjecting the so-diluted liquid to a beating action whereby to agglomerate said gluten formations with one another and squeeze the water containing non-gluten solids substantially out of the resultant agglomerates; and
6. Separating said gluten agglomerates from the remaining liquid.

In the present invention, steps are taken initially to withdraw a main portion of starch. To this end, a flour in water dispersion is formed by mixing the flour and water thoroughly using a mixing speed, for example, of 240–1200 revolutions per minute. The water is present in the dispersion in a weight ratio of 1.2–2.0 parts per part flour. This effects a good suspension of the flour in the water without the use of a large quantity of water. Thereafter, the dispersion is homogenized in a pin-mill. The purpose of this step is to assure that the mixture is completely homogeneous and that a workable dispersion is provided. Homogenization can be effected by rotating the pins of the pin-mill at a rotary revolution rate of between 400 and 900, rpm, e.g., 850 rpm.

Thereafter, the resultant homogenized dispersion is subjected to centrifugation and a small quantity of water is used to wash the starch fraction. There will be obtained by this centrifugation, a heavy fraction comprising the starch and a light fraction comprising a protein concentrate. The heavy starch phase can be treated in accordance with known techniques to recover the starch. The liquid protein concentrate is treated in accordance with the present invention.

The purpose of the steps thus far described is to prevent the gluten from hydrating or coalescing so that pure prime starch can be centrifuged directly from the slurry to leave the liquid protein concentrate behind. The resultant light phase liquid protein concentrate is then separated to remove therefrom the gluten containing protein. This is initially performed by allowing the concentrate to sit undisturbed without the addition of any other water, i.e., without any dilution whatsoever in a resting tank at a temperature of 30°–50°C for at least 10 minutes and up to 90 minutes or more. During this step, the gluten slowly commences to hydrate and to form small thread-like formations. During this resting, or maturing time, the small thread-like formations of gluten do not stick together to form large elastic masses. Thus, the gluten begins to grow in these forms while any starch present remains in a distinctly different form. After the resting time is complete, the liquid protein concentrate is diluted with fresh or recycled water and passed through a second mill of the pin-mill type. In this step, the gluten is completely hydrated and is now in a form whereby it can be separated in the form of large, elastic agglomerates from the other solid components present in the protein concentrate which other solid components contain low grade starch, fiber and the like.

Thus, in the overall process, there is first a selective removal of prime starch without affecting hydration of the gluten. When the main primary starch material is removed from the gluten containing mass, the gluten is hydrated in a specific manner whereby it is hydrated initially slowly and thereafter, substantially fully hydrated to form agglomerates which can readily be separated from low grade starches by simple physical means.

Generally speaking, the process can be carried out in its entirety with an amount of water between 2.0 and 3.0, preferably between 2.3 and 2.6 fold of the quantity of wheat flour. This is determined on a weight basis. The initial step, wherein the flour is initially mixed with water, is carried out at a temperature of 30-50°C, preferably at a temperature between 35° and 45°C. When additional water is added to wash the separated starch fraction following the first centrifuging step, that water can be at a substantially lower temperature, say a temperature of between 5° and 20°C.

The protein concentrate following centrifugation, is maintained generally at a temperature of 30°–50°C for at least 10 minutes, e.g., 10–90 minutes. Preferably, it is maintained in the undiluted quiescent state for a period of time between 30 and 45 minutes at a temperature between 35° and 40°C. Thereafter, it is subjected to pin-mill agglomeration which can be carried out by rotating the pins of the pin-mill to beat the so-formed strings or fibers. The pins rotate at a rate of between 400 and 900 rpm, and in any event, until the gluten forms in the form of larger formations or agglomerates with one another. This beating is generally carried out for between 2 and 30 seconds, depending on the volume of material being treated. Subsequent filtration to remove the gluten agglomerates from the other solids containing the low grade starch can be accomplished by using a vibrating screen such as one having a mesh size of between 80 and 140 using the ASTM scale.

The present invention has a number of distinct advantages over the known prior art processes. These advantages can be summarized as follows:

1. The method permits the separation of not only pure starch, but also very pure native vital gluten having a protein content of at least 80% on a dry basis by a simple means in a continuous operation.
2. The retention time of the material in each process step is short, thus minimizing bacterial contamination.
3. The total quantity of fresh water used is quite small with respect to the quantity of flour; and
4. The produced effluent, the quantity of which is small with respect to the flour quantity used, contains the soluble components of the flour in a relatively concentrated form permitting easy recovery thereof.

It must be remembered that at the heart of the present invention, there is the finding that when a principal portion of starch is removed from the flour/water dispersion, the remaining portion when treated as described herein does not, surprisingly, form a dough-elastic mass which requires repeated washing and mechanical manipulation, but instead, forms separate agglomerates from which pure gluten can be washed out with only a minimal quantity of water.

BRIEF DESCRIPTION OF DRAWINGS

To more fully illustrate the invention, there is appended hereto a schematic diagram of a continuous method for carrying out the invention.

BRIEF DESCRIPTION OF PROCESS

Referring to the drawing herein, wherein numbers in parentheses indicate the amount of material participating in each stage, the wheat flour is continuously suspended in a premixer 1 into fresh and/or recycled water at a ratio of one part of flour to 1.2–2.0 parts of water, depending on the protein content of flour. The temperature of the water can at this stage be as high as 50°C, depending on the desired temperature during the resting period 5. When carried out continuously and without delay, the operation does not cause the gluten to swell. The suspension is pumped into a homogenizing unit 2 of the pin-mill type, in which the flour is dispersed into the water to form a free-flowing dispersion. The dispersion is further pumped into a fractionating centrifuge 3, which continuously separates the main portion of prime quality starch from the liquid protein-containing phase. The starch fraction is pumped into a decanting centrifuge 4 and the concentrated starch fraction after the centrifuge is passed to a dryer. The remaining process water from the centrifuge 4 is recirculated to the process.

The liquid protein concentrate from 3 is pumped into a resting or maturing tank 5, where it is maintained at a specified temperature of 30°–50°C for between 10–90 mins. From the resting unit, the protein-containing fractions continuously pass, together with process water from 4 and 11, into a second mixer 6 of pin-mill type, where large gluten agglomerates are formed by the beating action of the mixing blades and at the same time, most of the water along with suspended and dissolved solids squeezed out of the so formed agglomerates. This latter step takes between 2 and 30 seconds. The temperature of the mass is generally between 30° and 50°C. The gluten agglomerates are separated on a vibrating screen 7, washed there shortly if needed and passed to a dryer. The dryer can be of a pneumatic type where no part of the gluten is subjected to temperatures higher than 60°C. Thus, the gluten is maintained in a vital and non-denatured condition.

The second grade starch containing the solubles and fiber constituents from the screen 7 is passed to a decanting centrifuge 8 and on to a vibrating screen 9 to separate the remaining few agglomerates, which are passed to a gluten dryer. The liquid fraction is again centrifuged in 10 to purify the second grade starch, which is then passed to a dryer. The remaining liquid is passed through a buffer tank 11 as process water back to circulation. The overflowing outpour 11 can be dried as third grade starch.

To more fully understand the invention and for purposes of fully illustrating the invention, the following examples are presented: EXAMPLE 1

In a pilot plant conforming to the diagram, wheat flour containing 13.2% protein and 15.0% moisture was treated continuously at a rate of 100 kgs/h. The temperature of the suspension water at the premixing stage 1 was 50°C, thus raising the temperature of the liquid protein concentrate after the fractionating centrifuge 3 to 40°C. The maturing time in the resting tank 5 was 30 minutes. The total quantity of fresh water used in this test run was 2.3-fold with respect to the quantity of flour. The effluent or third grade starch, the total quantity of which was 63 kgs/h containing 96% water and 0.7% protein, was discarded in this run. The test period lasted 7 hours and 700 kgs of flour was used in total.

The different products obtained in this experiment and their protein content are given in the following table:

|  | Yield kgs/h | Dry content, % | Dry yield % of dry flour | Protein content % dry basis |
|---|---|---|---|---|
| Gluten | 13.5 | 95.0 | 15.1 | 82.2 |
| 1st grade starch | 56.0 | 86.0 | 56.7 | 0.7 |
| 2nd grade starch | 24.0 | 88.0 | 25.0 | 8.0 |
| Effluent (3rd grade starch) | 63.0 | 4.0 | 3.0 | 17.5 |

EXAMPLE 2

Five test series were run in the manner shown in the diagram and described in Example 1, selecting the temperature of the mixing water at the premixing stage 1 such, that the temperatures of the liquid protein concentrates after the fractionating centrifuge 3 were 30°, 35°, 40°, 45° and 50°C, respectively. At each temperature, the retention or maturing time in the resting unit 5 was varied, whereat the following maturing times gave maximum gluten yields:

| Test No. | Temperature of liquid protein concentrate °C | Maturing time required for maximum gluten yield min |
|---|---|---|
| 1 | 30 | 90 |
| 2 | 35 | 45 |
| 3 | 40 | 30 |
| 4 | 45 | 15 |
| 5 | 50 | 10 |

What is claimed is:

1. A process for separating gluten having a protein content of at least 80% on a dry basis and in a vital or nondenatured condition from wheat flour which comprises:
    1. Mixing wheat flour with water in a weight ratio of 1.2–2.0 parts water per part wheat at a temperature of 30°–50°C to form a suspension of flour and water;
    2. Homogenizing the suspension to achieve a free-flowing dispersion of wheat flour and water by passing said suspension through a mill of the pin-mill type;
    3. Separating from said dispersion a main heavy portion (A) comprising starch and a light portion (B) comprising a protein concentrate;
    4. Allowing said light portion (B) to stand, free of agitation and without dilution, at 30°–50°C for at least 10 minutes to form gluten thread-like formations without separation;
    5. Thereafter adding to said light portion fresh or recycled water in the amount of at least one part water per part of said portion (B) and subjecting the so diluted liquid to a beating action whereby to agglomerate said gluten formations with one another and squeeze the water-containing non-gluten solids substantially out of the resultant agglomerates; and 6. Separating the gluten agglomerates from the remaining liquid.

2. A process according to claim 1, wherein the amount of water added in step 5 is between 1.0 and 2.0 parts of water per part of said portion (B) and the light portion (B) is held without dilution and agitation for between 10 and 90 minutes.

3. A process according to claim 1, wherein the total amount of water employed in the process is between 2.0 and 3.0 - fold that of the wheat measured on a weight basis.

4. A process according to claim 1, wherein each of the consecutive steps are carried out continuously.

5. A process according to claim 1, wherein the gluten which is separated in step 6 is dried at a temperature no higher than 60°C.

* * * * *